United States Patent [19]
Eyer et al.

[11] Patent Number: 5,982,445
[45] Date of Patent: Nov. 9, 1999

[54] HYPERTEXT MARKUP LANGUAGE PROTOCOL FOR TELEVISION DISPLAY AND CONTROL

[75] Inventors: Mark K. Eyer; Michael Field, both of San Diego, Calif.

[73] Assignee: General Instrument Corporation, Horsham, Pa.

[21] Appl. No.: 08/734,681

[22] Filed: Oct. 21, 1996

[51] Int. Cl.⁶ .................................................. H04N 5/50
[52] U.S. Cl. .............................. 348/461; 348/460; 348/7; 395/200.48
[58] Field of Search ................................ 345/327; 348/6, 348/7, 10, 12, 13, 906, 552–553, 563, 460, 554, 564, 461, 465; 455/5.1, 6.1, 6.2, 6.3, 4.2

[56] References Cited

U.S. PATENT DOCUMENTS

| | | | |
|---|---|---|---|
| 5,481,542 | 1/1996 | Logston et al. | 349/7 |
| 5,692,132 | 11/1997 | Hogan | 705/27 |
| 5,694,546 | 12/1997 | Reisman | 705/26 |
| 5,699,276 | 12/1997 | Roos | 379/106.03 |
| 5,710,887 | 1/1998 | Chelliah et al. | 705/26 |
| 5,729,594 | 3/1998 | Klingman | 379/93.12 |
| 5,732,219 | 3/1998 | Blumer et al. | 395/200.57 |
| 5,734,835 | 3/1998 | Selker | 395/200.79 |
| 5,740,252 | 4/1998 | Minor et al. | 380/49 |
| 5,740,430 | 4/1998 | Rosenberg et al. | 707/200 |
| 5,745,109 | 4/1998 | Nakano et al. | 345/340 |
| 5,745,909 | 4/1998 | Perlman et al. | 707/513 |
| 5,778,181 | 7/1998 | Hidary et al. | 395/200.48 |
| 5,790,201 | 8/1998 | Antos | 348/552 |
| 5,790,426 | 8/1998 | Robinson | 705/6 |
| 5,790,793 | 8/1998 | Higley | 392/200.48 |
| 5,793,972 | 8/1998 | Shane | 395/200.49 |
| 5,802,526 | 9/1998 | Fawcett et al. | 707/104 |
| 5,809,248 | 9/1998 | Vidovic | 395/200.49 |

OTHER PUBLICATIONS

Emory Thomas, Will Wink Get the Nod for Interactivity TV?, www.msnbc.com/news/187785.asp, Aug. 18, 1998.
J. Kunze, RFC 1736: Functional Recommendations for Internet Resource Locators, p. 7 (Feb. 1, 1995).
T. Berners–Lee et al., RFC 1738: Uniform Resource Locators (URL) (Dec. 1, 1994).
Chris Bucholtz, Software's Rising Stars, 231 Telephony 8, p. 50 (Aug. 19, 1996).

*Primary Examiner*—John K. Peng
*Assistant Examiner*—Dinh Cao Peter Chu
*Attorney, Agent, or Firm*—Barry R. Lipsitz; Ralph F. Hoppin

[57] ABSTRACT

Textual and graphical displays are provided on a television screen using a hypertext markup language (HTML). On-screen display devices allow a user to invoke hyperlinks to different pages of HTML-coded data in addition to functions calls for controlling television and non-television appliance functions. A method provides HTML-coded display data which is processed to provide a signal suitable for reproduction on a television. The display data may provide information on a featured movie or other presentation of an associated video programming service signal such as a network television broadcast. Function calls allow the control of various television functions and programming options, such as the purchase of pay-per-view programming, or television display options such as aspect ratio, channel, brightness, picture-in-picture, or split-screen. Non-television appliances which may be controlled with function calls include audio equipment which is associated with the programming service (e.g., surround sound, filtering) in addition to, for instance, a home heating and air conditioning system or other household appliances. The invention allows a designer to adapt the vast HTML resources of the Internet for use in the television environment for entertainment, educational or informational purposes.

30 Claims, 5 Drawing Sheets

HYPERTEXT MARKUP LANGUAGE PROTOCOL FOR TELEVISION DISPLAY AND CONTROL

BACKGROUND OF THE INVENTION

The present invention relates to an apparatus and method for providing textual and graphical displays using hypertext markup language (HTML) in a television decoder. Additionally, HTML is adapted for use in controlling various television functions.

Hypertext Markup Language (HTML) is a system for marking documents to indicate how the document should be displayed, and how various documents should be linked together. HTML has been used extensively to provide documents on the computer communications network known as the Internet. The Internet includes a vast collection of interconnected documents which are stored in computers all over the world in a system known as the World Wide Web (i.e., the Web). The documents are organized into web spaces, where a web space includes a home page and links to other documents which may be in the local web space or in an external web space. Such links are known as hyperlinks. Documents may include moving images, text, graphical displays, and sound.

HTML is a form of Standard Generalized Markup Language (SGML), defined by the International Standards Organization (ISO), reference number ISO 8879:1986. HTML specifies the grammar and syntax of markup tags which are inserted into a data file to define how the data will be presented when read by a computer program known as a browser. The data file, which is typically stored on a Web server, includes one or more Web pages which are visited by users who have computers which may run different browsers. When a page is visited, typically via a telephone connection, HTML data is downloaded to a user's computer. The computer's browser processes the data to format a layout for the page so the page can be viewed by the user on a computer screen.

An SGML document includes three parts. The first part describes the character set, or codes, which are used in the language. The second part defines the document type, and which markup tags are recognized. The third part is known as the document instance and contains the actual text and markup tags. The three parts may be stored in different files. Furthermore, HTML browsers assume that files of different pages contain a common character set and document type, so only the text and markup tags will change for different pages.

The base character set for HTML is Latin-1 (ISO 8859/1), which is an eight-bit alphabet with characters for most American and European languages. The 128-character standard ASCII (ISO 646) is a seven-bit subset of Latin-1. For simplicity and compatibility with different browsers, many Web pages include only an ASCII character set. Furthermore, non-ASCII characters may be defined using sequences of ASCII characters. For example, the character "è" is defined as "è".

HTML characters are enclosed in angled brackets to distinguish them from the page text. The characters may appear alone, or may appear at the start and end of a field of the page text. For example, <P> indicates the start of a new paragraph, while <I> Welcome to my home page</I> indicates the phrase "Welcome to my home page" should be italicized. Generally, HTML tags provide text formatting, hypertext links to other pages, and links to sound and picture elements. HTML tags also define input fields for interactive Web pages.

The following list identifies some of the more common HTML codes and functions:

| HTML Code | Description |
| --- | --- |
| <A> | anchor code - defines a section of text as a hyperlink or target of another hyperlink |
| <blockquote> | quoted text |
| <BODY> | main portion of page |
| <B> | bold face |
| <?-comment-> | author comment - does not appear on page |
| <EM> | emphasized text, usually italicized |
| <HEAD> | header or title |
| <HR> | horizontal rule |
| <HTML> | denotes an HTML document |
| <I> | italicize |
| <BR> | line break |
| <LI> | list item |
| <UL> | unordered list |
| <OL> | ordered list |
| <P> | start a new paragraph |
| <STRON> | strongly emphasize text, usually bold face |
| <TITLE> | title of document |
| <TT> | typewriter text |
| <U> | underline |

Moreover, there are currently three standardized levels of HTML. Level 1 defines a baseline level with which all Web browsers must be compatible. Level 2 includes the elements of level 1 in addition to tags for defining user input fields. Level 3 adds markup tags for various features such as tables, figures and mathematical equations. The levels are fully backwards compatible.

Hypertext is so-named because it allows a user to access different pages in different orders using hyperlinks, rather than in a predetermined, linear manner. Moreover, a particular hypertext application known as hypermedia includes elements other than text, such as images, video, and audio. HTML can specify links to multimedia objects. Links in an HTML hypertext page usually appear as highlighted text which is known as the anchor of the link. Moreover, an image, such as an icon, can be an anchor, which is activated, for example, by the user clicking on the icon using a mouse or other pointing device. Furthermore, images known as image maps can include a number of regions which are themselves individual anchors.

An HTML application is made available to users on the Web by storing the HTML file in a directory that is accessible to a server. Such a server is typically a Web server which conforms to a web browser-supported protocol known as Hypertext Transfer Protocol (HTTP). Servers that conform to other protocols such as the File Transfer Protocol (FTP) or GOPHER may also be used but do not support interactive HTML files.

HTTP defines a set of rules that servers and browsers follow when communicating with each other. Typically, the process begins when a user clicks on an icon in an HTML page which is the anchor of a hyperlink, or the user types in a Uniform Resource Locator (URL), described below. A connection is then made to the server at the address and port number specified by the URL. Next, the browser sends a request to retrieve an object from the server, or to post data to an object on the server. The server sends a response to the browser including a status code and the response data. The connection between the browser and server is then closed.

FTP is a file transfer protocol supported by Transmission Control Protocol/Internet Protocol (TCP/IP) protocol stacks.

In particular, FTP is session oriented while HTTP is not. Consequently, unlike HTTP, with FTP, the server is required to maintain a list of active clients.

GOPHER is an indexing system that enables a user to access various Internet resources through a menu-driven system.

Other protocols include TELNET, NEWS, or MAILTO. A TELNET program allows a user to connect to another computer and use it as if the user were sitting at the keyboard of the computer. NEWS indicates that a link to a USENET newsgroup should be made, for example, to access a specific news article. MAILTO indicates an Internet Mail Protocol. If a user targets a mail type URL, the browser will open a window to allow the user to create a mail message to be delivered to the indicated e-mail address. The above protocols are standardized by the Internet Engineering Task Force (IETF) and are supported by most web browsers.

The URL is a unique address which identifies virtually all files and resources on the Internet. A URL has the form:

method://server:port/path/file#anchor.

The "method" of accessing the resource is the web browser-supported protocol, and may include, for example, HTTP, FTP, GOPHER, TELNET, NEWS, or MAILTO. The "server:port" indicates the name of the server which is providing the resource, and is alternatively known as the Internet domain name. For example, many companies will use their company name as part of the server field. The port designation is the port number on the server, but is usually not used since a default port is assumed. The "path" indicates the directory path to the resource. The file indicates the file name of the resource. The "anchor" indicates the named element in the HTML document. Not all fields are required.

For example, consider the following URL:

http://www.company.com/news/june.html.

The access method is HTTP, the server is www.company.com, there is no port specified, the path is news, the file is june.html, and there is no anchor. Examples of FTP, GOPHER, TELNET, NEWS, and MAILTO URLs are, respectively:

ftp://ftp.uu.net/doc/literary/obi/World.Factbook;

gopher://gopher.micro.umn.edu/;

telnet://compuserve.com/;

news:alt.cows.moo; and mailto:president@whitehouse.gov.

Moreover, interactive Web applications use a client-server standard known as the Common Gateway Interface (CGI). A CGI program generates HTML in real-time to produce a dynamically generated Web page. CGI programs, or scripts, perform various Web functions. For example, a CGI program known as Imagemap processes imagemaps for servers. Moreover, HTML forms often require CGI scripts to process user-entered information. CGI scripts act as an interface between Web servers and other computer applications, including database managers and order processing systems.

In view of the rapidly increasing use of Web pages and other resources which are created using HTML, it would be advantageous to provide a scheme for adapting such resources for use by consumers and others via television or other broadcast or pre-recorded media. In particular, it would be desirable to provide graphical and textual displays for use with a television for educational and entertainment purposes. Such displays should be compatible to the extent possible with existing transmission and receiving equipment including set-top decoders and the like, and should further be compatible with current communication protocols such as those for transmission of digital television signals via satellite and/or cable plants.

Furthermore, the system should provide the capability to control various television functions such as channel selection, volume, and language preference, in addition to interactive operations such as the purchase of near-video-on-demand programming or other home shopping products or services, as well as non-television appliance functions such as for associated audio equipment, or, lastly, for a home heating and air conditioning system, security system or the like. The present invention provides a system having the above and other advantages.

SUMMARY OF THE INVENTION

In accordance with the present invention, an apparatus and method are presented for providing textual and graphical displays using hypertext markup language (HTML) for use with a television decoder. Additionally, the invention allows the control of various television functions, such as channel selection, volume, or language preference, in addition to non-television functions, such as programming of an automated home heating system or the like. With the invention, the vast HTML resources of the Internet may be adapted for use in the television environment for entertainment, educational or informational purposes.

A method for providing display data for use with a television includes the step of providing a data signal which includes display data which is coded according to a hypertext markup language. The display data signal is processed to provide a signal suitable for reproduction on a television or similar video display appliance. In particular, the display data may allow a user to invoke hyperlinks to view different parts of the display data, such as different display data pages. The display data may also be used to allow a user to invoke function calls which control a function which may or may not be related to the television or an associated programming service signal.

Moreover, the display data may provide information regarding an associated video programming service signal, such as a network television broadcast signal. The display data may provide information on a featured movie or other special presentation, or may provide a programming guide with program scheduling information. The display data may include a viewer input field which allows viewing of the associated video programming service signal on a fee basis. For example, when an interactive capability is provided between a television decoder and a cable system headend or other programming service provider station, a user may enter a password which authorizes the purchase of pay-per-view programming.

Furthermore, the display data signal and associated video programming service signal may be processed for display on the television in an overlay (e.g., combined) manner. For example, the display data may be provided in a border region, while the video programming service signal is provided in an inset region, or vice-versa. Alternatively, a split-screen, picture-in-picture, or other configuration may be provided.

The display data may allow a user to invoke hyperlinks and function calls to view display data and/or the associated video programming service signal. For example, the display data may be used to provide a screen with buttons or graphical or textual devices which may be selected by a user through a remote control. When a particular button is selected, a corresponding hyperlink and/or function call may then cause the display of a screen including additional display data (e.g. an additional HTML page) and/or a particular video programming service channel, and may further control a particular television function, such as volume, muting, or the like, or a non-television function, as mentioned.

A corresponding apparatus is also presented.

Additionally, a receiver is presented for providing display data for use with a television. The receiver may be a television decoder (e.g., set-top box) which has an input for receiving a data signal comprising the display data which is coded according to a hypertext markup language. Furthermore, a display data processor is included for processing the display data signal to provide a signal suitable for reproduction on the television.

The receiver also has an input for receiving a video programming service signal, and a video processor for processing the video programming service signal. This processor may perform video decompression processing. The display data provides information regarding the video programming service signal.

A user command processor in the receiver is operatively associated with the display data processor for receiving user commands for allowing selective viewing of the display data. The user commands may be provided, for example, by an infrared remote control transmitter, or a mouse or other pointing device. Moreover, the user command processor may work in conjunction with the video processor for receiving user commands for allowing selective viewing of the video programming service signal. That is, commands entered by a user may be received by the user command processor and sent to the video processor to provide the appropriate action. In this way, the user can select the programming service and display data he wishes to view, and optionally a particular viewing format such as, for example, aspect ratio (e.g., movie box format), color settings, brightness, contrast, or other display options.

The display data may include URLs which represent function calls which are implemented in accordance with the user command processor for allowing selective control of functions of the television or a non-television related device. For example, a display data screen may include a button which initiates a function call for changing the volume of the television or selecting a language preference of an available soundtrack or closed captioned signal. Another button may initiate a function call for setting an automated heating and air conditioning system in a household, for instance. Moreover, the relationship between the syntax of the function calls and the resulting functions may be determined according to a uniform resource locator syntax disclosed herein.

DETAILED DESCRIPTION OF THE INVENTION

A method and apparatus are presented for providing textual and graphical displays using hypertext markup language (HTML) for use with a television decoder. Additionally, HTML is adapted for use in controlling various television and other functions in a hypertext markup language protocol defined herein as "HTVP." HTVP may be considered to be a type of HTML which is used in implementing the functions in accordance with the present invention.

The HTVP concept, which is a framework upon which future protocols can be developed and defined, builds upon the methods used by HTML pages for URL syntax. As mentioned, a URL, or Uniform Resource Locator, typically defines three things: a communication protocol, a logical access path to be used by that protocol, and the name of an object. Example object types include bitmap images, other HTML pages, and files of virtually any type or format.

The HTVP URL type represents a new function associated with URLs within the HTML syntax. The general form of an HTVP URL in accordance with the present invention is defined as:

htvp://function_domain/receiver_function?function_parameters.

The "function_domain" field identifies the family of receiver functions of which the identified function is a part. A standard or default function_domain can be defined as "std." The std function may define a group, or family, of common functions which can be made available as an open standard for use by the public at large. Furthermore, a proprietary function_domain may also be defined which is recognized only by a receiver of a particular company. For example, a function_domain of "company" may be used. A receiver that does not recognize functions in a certain domain will ignore the URL in which they are referenced.

The "receiver_function" field identifies a specific receiver function or application program interface (API). For example, when the receiver is a television decoder (e.g., set-top box), functions may include "channel_up," "select_virtual_channel," "buy_program," "buy_package," "link_to_page," "VIEW," "select_language," "mute_audio" and so forth. These receiver_function fields instruct the decoder to adjust the television display and/or sound as indicated.

The "function_parameters" field provides an optional list of parameters to be passed to the receiver to execute functions therein. These parameters may be used to select sub-functions, or provide fixed parametric values. For example, when the receiver_function field is "select_virtual_channel," a required parameter would be the channel number for which the programming should be displayed. In this case, a URL that would acquire virtual channel 444, for example, would have the syntax:

htvp://std/select_virtual_channel?channel=444.

Thus, the function_parameters field is "channel=444".

Furthermore, the function_parameters field may include more than one parameter, where each parameter is of the form:

parameter_ID=parameter_value, and a division between parameters is indicated by an ampersand (&). For example, a URL identifying an HTVP receiver_function called "function_1" that has three parameters, "parm1," "parm2" and "parm3", with respective values "value1," "value2," and "value3", has the syntax:

htvp://std/function_1?parm1=value1&parm2=value2 &parm3=value3.

For example, function_1 may allow a user to purchase various products or services via an interactive cable television network, where parm1, parm2 and parm3 indicate the purchase number, and value1, value2 and value3 indicate the selected items.

Moreover, the function_parameters field may be incorporated into a URL for an HTML page following the filename field. Provision may be made for interactivity such that a user can interact with a processor which operates using commands similar to a Web browser. That is, the user can enter or select a function_parameters field using an input device such as a mouse, other pointing device, infrared transmitter, or keyboard. The processor receives the function_parameters field entered, appends the field to a URL, and transmits a request back to a server.

For example, a user may wish to retrieve stock quote information using the television. In this case, assume the relevant Web site is "www.stocks.com," the relevant server file is "quotes," and the user-entered function_parameters field will be the symbol for a particular stock (e.g., GM) which is recognized by the Web site, e.g., "tick=GM," where parameter_ID=tick, and parameter_value=GM. In this case, the processor transmits the following URL to the Web site server:

http://www.stocks.com/quotes?tick=GM.

Here, the "?" is specified by the definition of the HTML FORM command as the separator between the name of the program on the server that executes the database search ("quotes" in this case) and the parameters passed into it (e.g., tick=GM). The syntax used to delimit the parameters and their values is defined in the same manner as the POST method within the HTML FORM type.

Generally, the hypertext markup element FORM is used to define an area of a page which contains objects for input from the viewer. The objects may be input fields and other interactive objects, such as pop-up menus, check boxes and buttons. There can be any number of forms on a page, each of which begins and ends, respectively, with the tags <FORM> and </FORM>. The beginning FORM tag takes an ACTION attribute that specifies the action to take with the user-entered information. The ACTION attribute takes a URL as its value which can be either the URL of a CGI script or a MAILTO URL. For example, when the input field "tick=GM" is received, the action is to send a form HTML page which provides the requested information, including the stock price. The POST markup element indicates that the FORM content is in a standard configuration.

Figure 1:
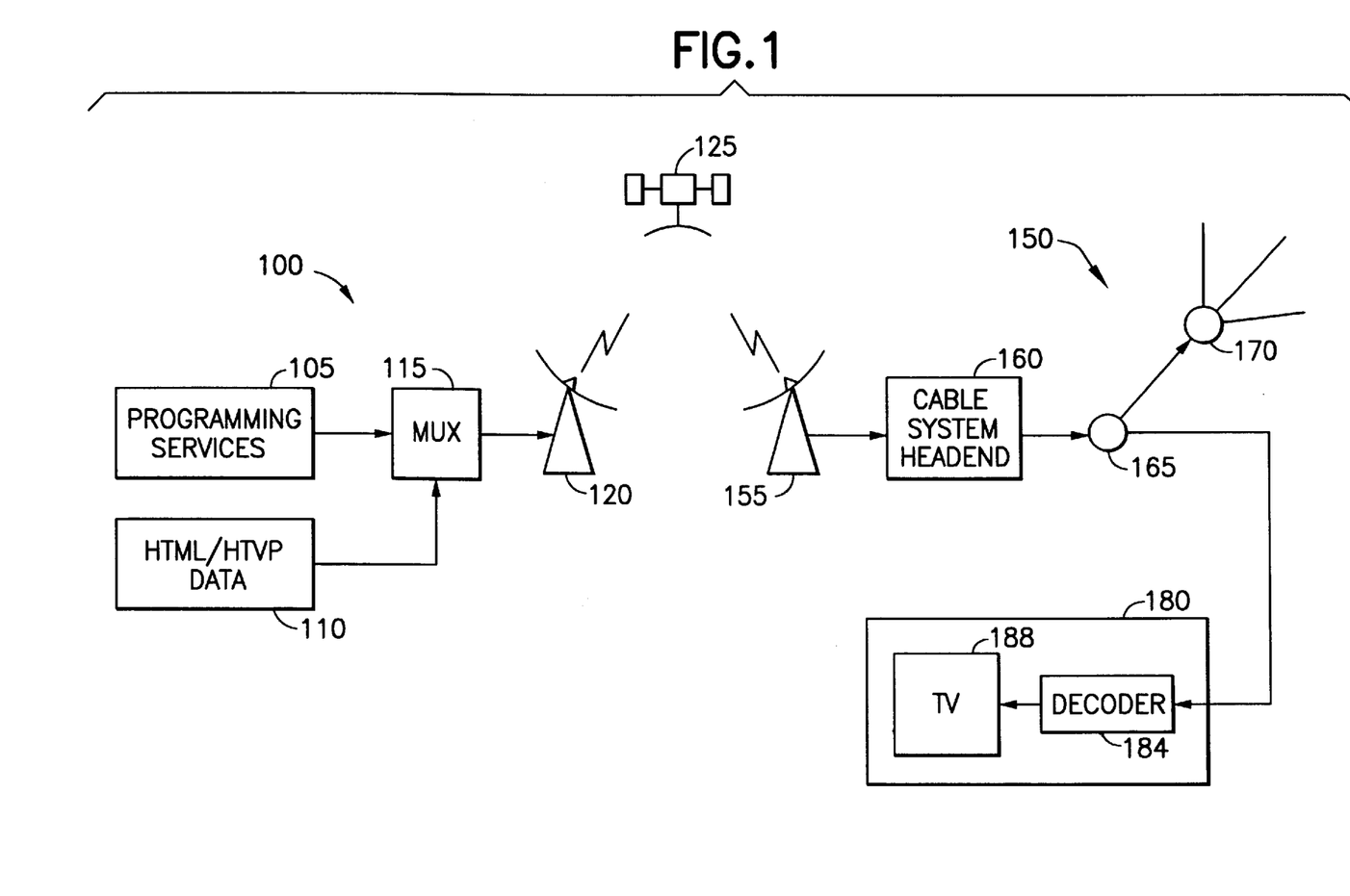
FIG. 1 is a block diagram of a television transmission system in accordance with the present invention.

FIG. 1 is a block diagram of a television transmission system in accordance with the present invention. The system includes a transmitter side, shown generally at 100, and a receiving side, shown generally at 150. The transmitting side 100 includes a programming services function 105, which comprises video and audio programming services from network television stations and the like. The programming services audio/video data, which may be carried as digital data, is multiplexed with HTML/HTVP data from an HTML/HTVP data function 110. The HTML/HTVP data may be related to some or all of the programming services and include, for example, display screens which allow a user to purchase programming or other products or services, or provide information on the available programming services, such as movie reviews, programming guides, and so forth. Moreover, the HTML/HTVP data may provide unrelated information such as stock quotes, weather information, airline travel schedules, or virtually any resource which is constructed with HTML. Moreover, HTML/HTVP data may include information for controlling various television functions.

The programming services data and the HTML/HTVP data are provided to a multiplexer 115, which outputs a corresponding combined signal to a transmitting antenna 120. The transmitting antenna transmits a signal to a receiving antenna 155 via a satellite 125. The signal may be carried as a packetized digital transport stream which conforms to, for example, the Moving Pictures Experts Group-2 (MPEG-2) standard.

The transport stream is provided to a cable system headend 160, where the data may be processed for distribution to cable system customers. For example, various decryption/ encryption and scrambling/descrambling operations may take place. Additionally, insertion of local commercials and programming may occur. Moreover, at the cable system headend 160, it is possible to provide HTML/HTVP data in addition to, or in lieu of, the data provided by function 110 using means not shown. For example, HTML/HTVP data from local businesses and broadcasters may be provided. Moreover, the transport stream may be broadcast directly to the user via a direct broadcast satellite system, microwave broadcast system, or the like.

The cable system headend 160 distributes the transport stream to subscribers via representative hubs 165 and 170, and spokes as shown. At a subscriber's home 180, a decoder receives the transport stream, decodes it, and provides an audio and video signal for reproduction on a television 188 or similar video display appliance.

Figure 2:
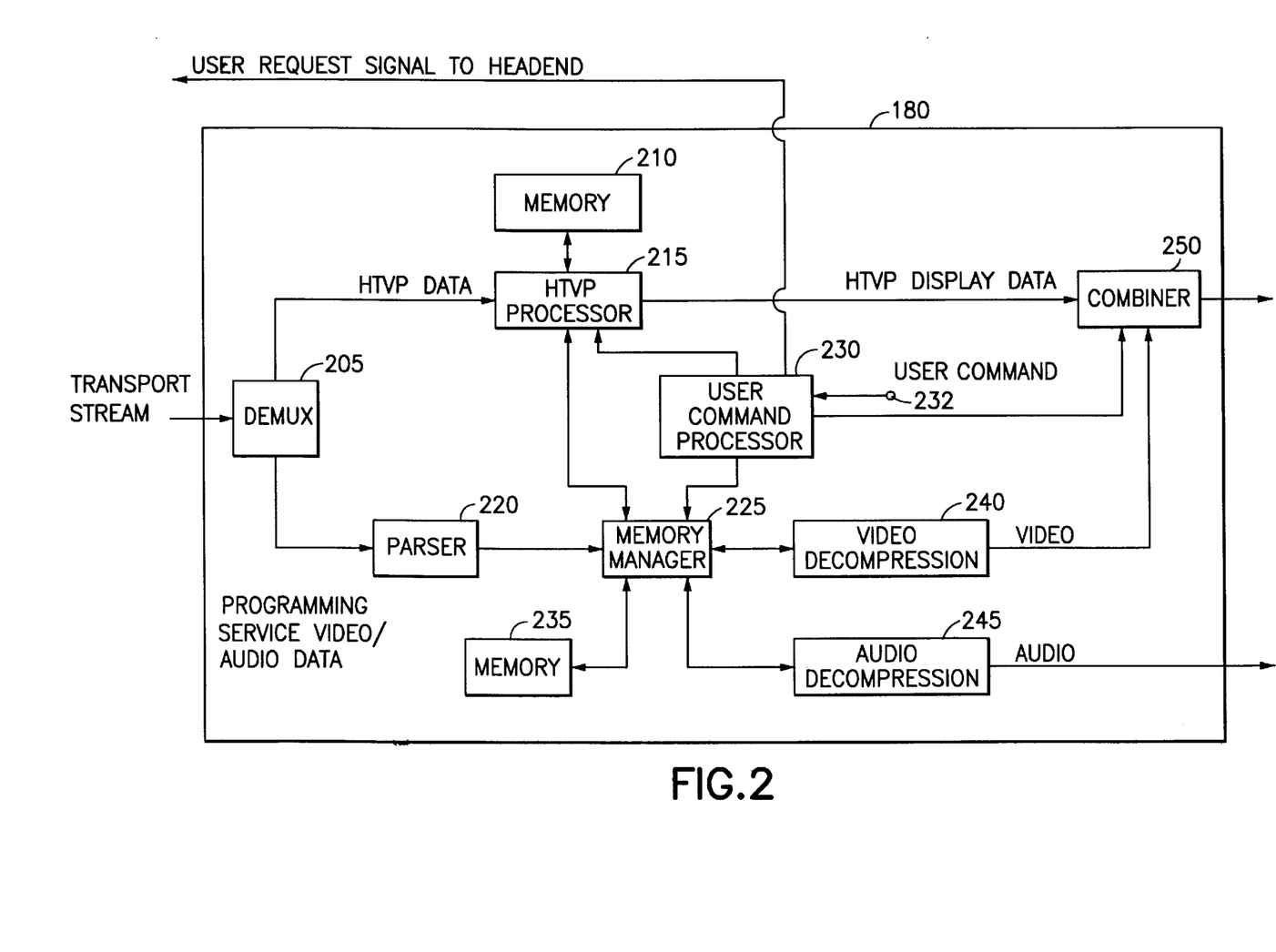
FIG. 2 is a block diagram of a television receiver in accordance with the present invention.

FIG. 2 is a block diagram of a television receiver in accordance with the present invention. The decoder, shown generally at 180, corresponds to the decoder of FIG. 1. The decoder 180 receives the transport stream from the cable headend, or alternatively, directly from a satellite in a direct broadcast satellite communication scheme. The transport stream is demultiplexed at demultiplexer 205 to recover the HTML/HTVP data and programming service audio/video data as shown. The programming service data is parsed at parser 220 and provided to a memory manager 225. The memory manager, which may include a central processing unit, controls the decoding of the audio and video data by interacting with a video decompression processor 240, an audio decompression processor 245 and a memory 235.

The memory 235, which may comprise a dynamic random access memory (DRAM), is used to temporarily store the video pictures prior to decoding and presentation of the video on the television screen. The video decompression processor 240 provides a variety of processing functions, such as error detection and correction, motion vector decoding, inverse quantization, inverse discrete cosine transformation, Huffman decoding and prediction calculations, for instance. After being processed by the decompression processor 240, the video pictures are output to a combiner 250. Alternatively, the decoded data may be temporarily stored in the memory 235.

The audio decompression processor 245 processes audio data using, for instance, inverse quantization, Huffman decoding, and spectral shaping algorithms.

The memory manager 225 receives commands from a user command processor 230, which, in turn, receives a user command via terminal 232. The user command may be input, for example, by a mouse or other pointing device, a keyboard, or an infrared remote control or the like. The user command processor 230 can provide a user request signal via the cable plant or a telephone line to the cable headend to achieve an interactive capability, and can further provide a control signal to the combiner 250. Additionally, means (not shown) may be used for maintaining a record of user commands which is periodically transmitted to the cable headend or other broadcast station such as in a store-and-forward routine. The memory manager 225 also receives commands from an HTVP processor 215.

The HTML/HTVP processor 215, which communicates with a memory 210, receives the HTML/HTVP data from the demultiplexer 205. The processor 215 may include a central processing unit which implements an HTML-based code which is analogous to a Web browser. The HTML/HTVP processor also receives commands from the user command processor 230. HTML/HTVP display data provided by the processor 215 is then provided to the combiner 250, where it may optionally be combined with the video data from processor 240 to produce a graphical display on a television screen wherein the display data overlays the programming service data, or vice-versa. The memory 210 may include service map data which allows an HTML/HTVP page displayed on the television screen to link to other HTML/HTVP pages. Moreover, note that the HTML/HTVP code may be downloaded to the decoder 180 via the transport stream or a telephone line (not shown), and/or installed locally, e.g., via a smart card.

Figure 3:
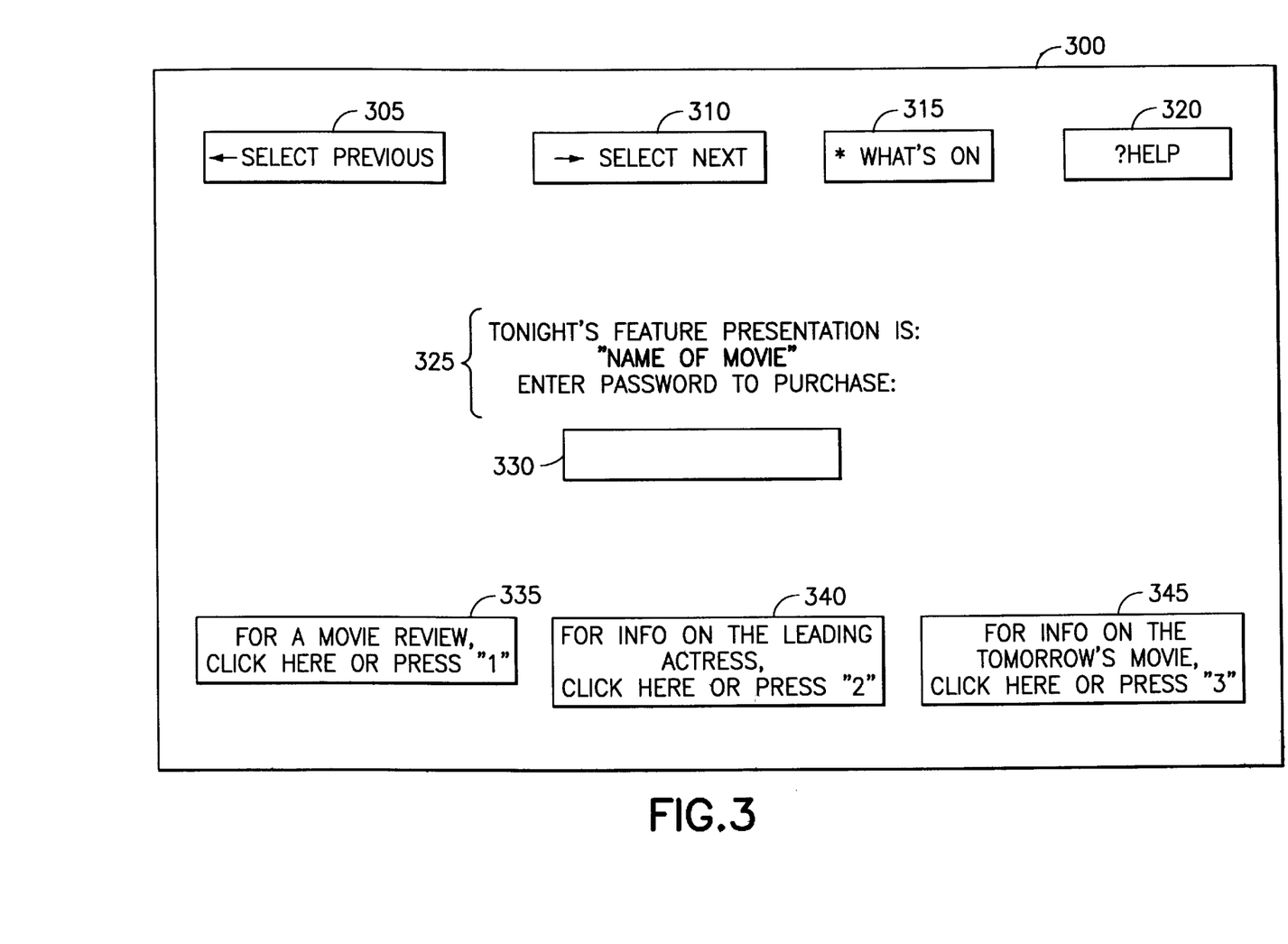
FIG. 3 is an illustration of a screen with HTML/HTVP display data in accordance with the present invention.

FIG. 3 is an illustration of a screen with HTML/HTVP display data in accordance with the present invention. The screen, shown generally at 300, comprises an HTML/HTVP page which was provided using the HTML/HTVP display data from processor 215 in FIG. 2. The screen 300 can include a variety of textual and graphical displays in addition to providing an interactive capability. For example, the screen 300 includes buttons 305, 310, 315, 320, 335, 340 and 345, which define hyperlinks to other HTML/HTVP pages or function calls. The buttons may be selected by the user via a pointing device, infrared remote control, or the like. The buttons may include text and/or graphics, such as icons, which inform and entertain the user.

Button 305 informs the user that by pressing the "←" key on the keypad of a remote control, for instance, a previous HTVP display page may be selected for viewing. Referring again to FIG. 2, when the user command processor 230 receives the user's command, it passes it to the HTVP processor 215 to cause the processor to provide the appropriate display data to the television. Moreover, the user command processor 230 may provide a signal to the memory manager 225 to provide audio and or video of the programming service in conjunction with, or in lieu of, the HTVP data.

Button 310 informs the user that by pressing the "→" key, a next page may be selected for viewing. Button 315 informs the user that by pressing the "*" key, a page which includes a programming guide may be selected for viewing. Button 320 informs the user that by pressing the "?" key, a page with helpful information may be selected for viewing. Button 335 informs the viewer that by pressing the "1" key, a page with a movie review may be viewed. Button 340 informs the viewer that by pressing the "2" key, a page with information on the movie's leading actress may be viewed. Button 345 informs the viewer that by pressing the "3" key, a page with information on tomorrow's featured movie may be viewed.

Additionally, the screen 300 includes a region 325 which does not initiate a hyperlink but provides relevant text and/or images, such as the title of a featured movie. Field 330 is an HTVP input field which provides interactive capability. Interactive cable television systems are becoming increasingly common. Such systems allow a subscriber to transmit signals from their homes to the cable system headend for ordering pay-per-view movies, sports and other programming services, including near-video-on-demand (NVOD), to purchase goods or services through a home shopping channel, or to participate in surveys, contests and the like. Alternatively, if the cable plant does not provide such an interactive capability, the television decoder may be coupled to a telephone line for automatically dialing a computer which maintains billing and authorization records, e.g., in a store-and-forward routine. In either case, an addressable decoder is required.

In particular, input field 330 allows a user to enter a password, for example, using the keypad on a handheld remote control, to authorize the purchase of a pay-per-view program. Referring again to FIG. 2, when the user command processor receives the password, it will transmit it to the cable headend or other location for authorization. When the request is authorized, the corresponding programming service and/or HTML/HTVP data will be transmitted to the decoder 180 in the manner discussed.

Figure 4:
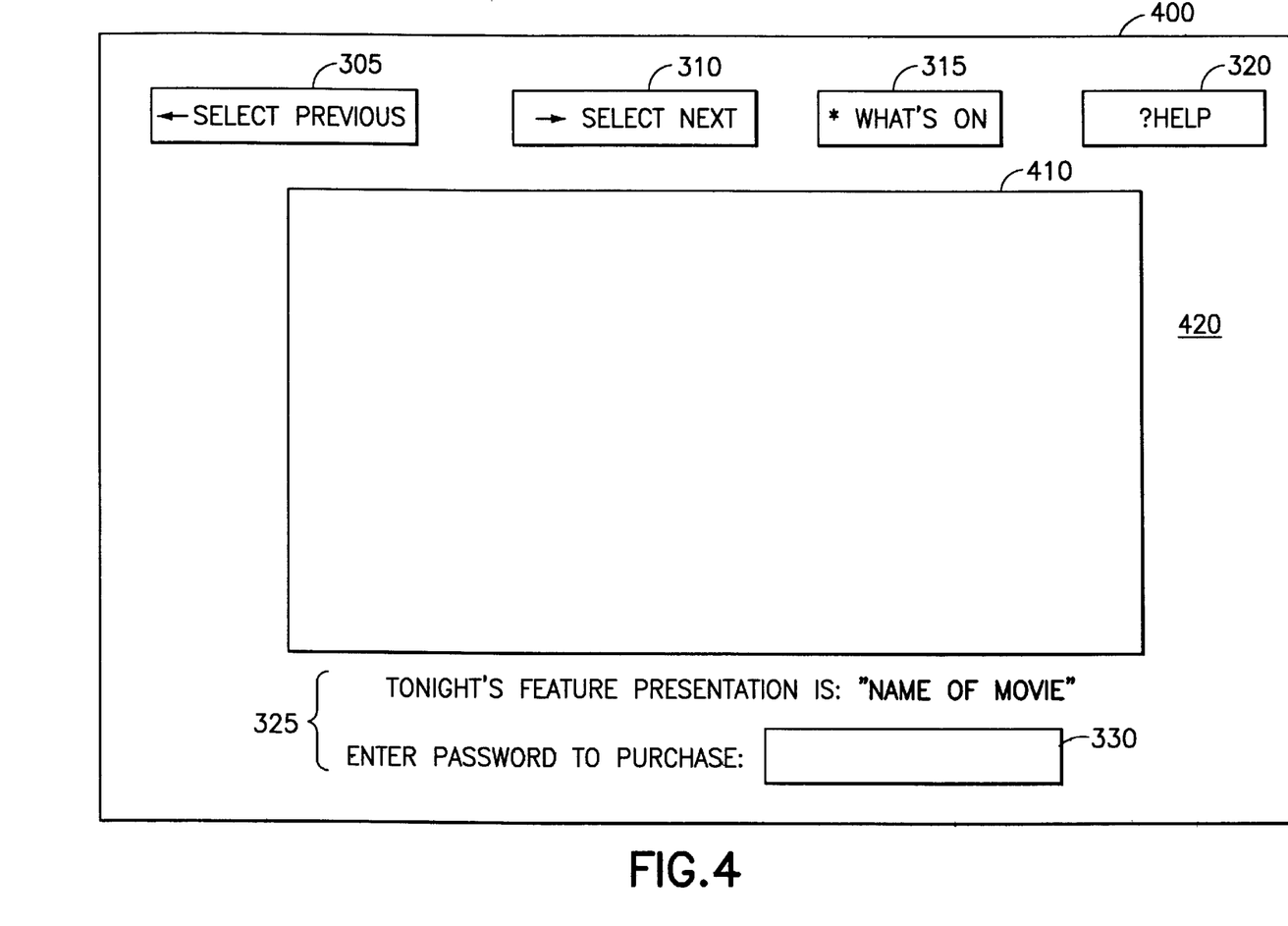
FIG. 4 is an illustration of a screen with HTML/HTVP display data combined with a video programming service signal in accordance with the present invention.

FIG. 4 is an illustration of a screen with HTVP display screen combined with a video programming service signal in accordance with the present invention. The screen, shown generally at 400, includes a combination, or overlay, of HTML/HTVP display data, and a programming service video. Techniques for providing multiple images in a television display (e.g., picture-in-picture) are well known in the art. Any such well known technique may be used to provide the combined display of FIG. 4.

In the example shown, the screen 400 includes a sub-region, or inset, 410 in which a video programming service is displayed. Elements 305, 310, 315, 320 325 and 330 are the same as discussed in connection with FIG. 3. This screen configuration allows the user to view the programming service video, which may be the current channel the user had been viewing, while also viewing the HTML/HTVP display data in the surrounding region 420 to learn about other available programming options. Alternatively, the sub-region 410 may provide a free, introductory preview of a pay-per-view program, while the HTML/HTVP display in the surrounding region 420 provides information on ordering the entire program.

Moreover, the screen 400 may provide a HTML/HTVP display which is updated real-time with information that is unrelated to the video image present in sub-region 410. For example, HTML/HTVP data may provide stock prices or weather information, while the sub-region 410 allows the user to independently view any available programming service. In a further alternatively, the HTML/HTVP display may be provided in the sub-region 410 as an overlay to the programming service video which is present in the surrounding region 420. Other variations and combinations are possible, including split-screen and picture-in-picture.

Furthermore, the user may provide a command for switching or otherwise modifying the relative positions of the HTML/HTVP display and the programming service video. The user command processor 230 of FIG. 2 will be responsive to the user's command in sending a control signal to the HTML/HTVP processor 215, memory manager 225, and/or the combiner 250 for controlling the output signal to the television.

The HTVP concept can be extended to various applications. For example, it can provide a text service, which is a virtual channel that provides the user with a number of inter-linked text/graphics screens. As with teletext (e.g., closed captioning), the source data for each screen is broadcast in a carousel, or cyclic, manner such that data for a complete page is transmitted in one or more segments over a number of successive transmission cycles. The decoder must wait until the desired page is transmitted in full. When the full page is captured, it is stored in memory, such as a random access memory (RAM) (e.g., memory 210), for subsequent processing and display.

In one application, HTVP can provide a report back feature. In this case, a standard application program interface (API) can be used. An API is a set of predetermined functions for building an application. For example, an API can be used that defines a particular design, color, or pattern. Moreover, an API can be used to build an HTML page which include a button that, when selected, causes a parameter string to be processed by a store-and-forward routine in the decoder. For example, an API could include a telephone number to call and a message to deliver. An option could allow either immediate reporting or store and forward operation.

Another option could require correct entry of a password to enable the function. Though not part of the parameter list, the data report can include the unit address for informing the upstream equipment of the source of the request or report. Thus, for example, a decoder could automatically report diagnostic information to a cable system headend when the decoder is not operating properly.

Various other functions can be supported by the HTVP concept. In the following list, the first column lists a proposed HTVP syntax, while the second column explains the associated function. The implementation of a function using the suggested syntax in accordance with the present invention is referred to as a "function call." The HTVP commands can be linked to appropriate buttons or other graphical displays on a television screen interface to facilitate selection.

| Syntax | Function |
| --- | --- |
| htvp://std/channel_down | Tunes to the next lower channel number |
| htvp://std/channel_up | Tunes to the next higher channel number |
| htvp://std/getchannel_number | Returns an ASCII text string representing the channel number |
| htvp://std/getchannel_name | Returns an ASCII text string representing the channel name |
| htvp://std/mute | Enables audio muting |
| htvp://std/unmute | Disables audio muting |
| htvp://std/volume_down | Lowers the audio volume by one level |
| htvp://std/volume_up | Raises the audio volume by one level |
| htvp://std/program_name | Returns the program name |
| htvp://std/purchase?item=xxx | Records a purchase of an item specified with an item identifier. Can be used for impulse pay per view or items unrelated to the current material being viewed. |
| htvp://std/skip_back | Changes channel to a theater of an NVOD program that is earlier than the current channel. |
| htvp://std/set_language?lang=xxx; [audio\|subtitle] | Set the language preference |
| htvp://std/ir_blast?string=xxx | Transmit the quoted string (xxx) using an infrared blaster |

In the table above, an "infrared blaster" refers to a secondary infrared transmitting device which transmits an infrared signal in response to an infrared or other command received by a user. For example, a user may transmit an infrared command from a hand held transmitter to a set-top decoder to view a particular television channel. The decoder will execute a function call which switches the television to the appropriate channel, and also transmit an infrared signal for example, to a VCR to cause the VCR to begin recording, or to an audio component to cause the component to operate in a particular mode (e.g., surround sound).

Moreover, the HTML/HTVP concept may be extended to allow the viewer to control household appliances other than a television when the appliances are linked to the decoder. For example, an HTVP page may provide hyperlinks, input fields, and function calls which allow the viewer to program a household security system, heating and cooling system, fire alarm system, or the like for convenience or energy conservation purposes.

Figure 5:
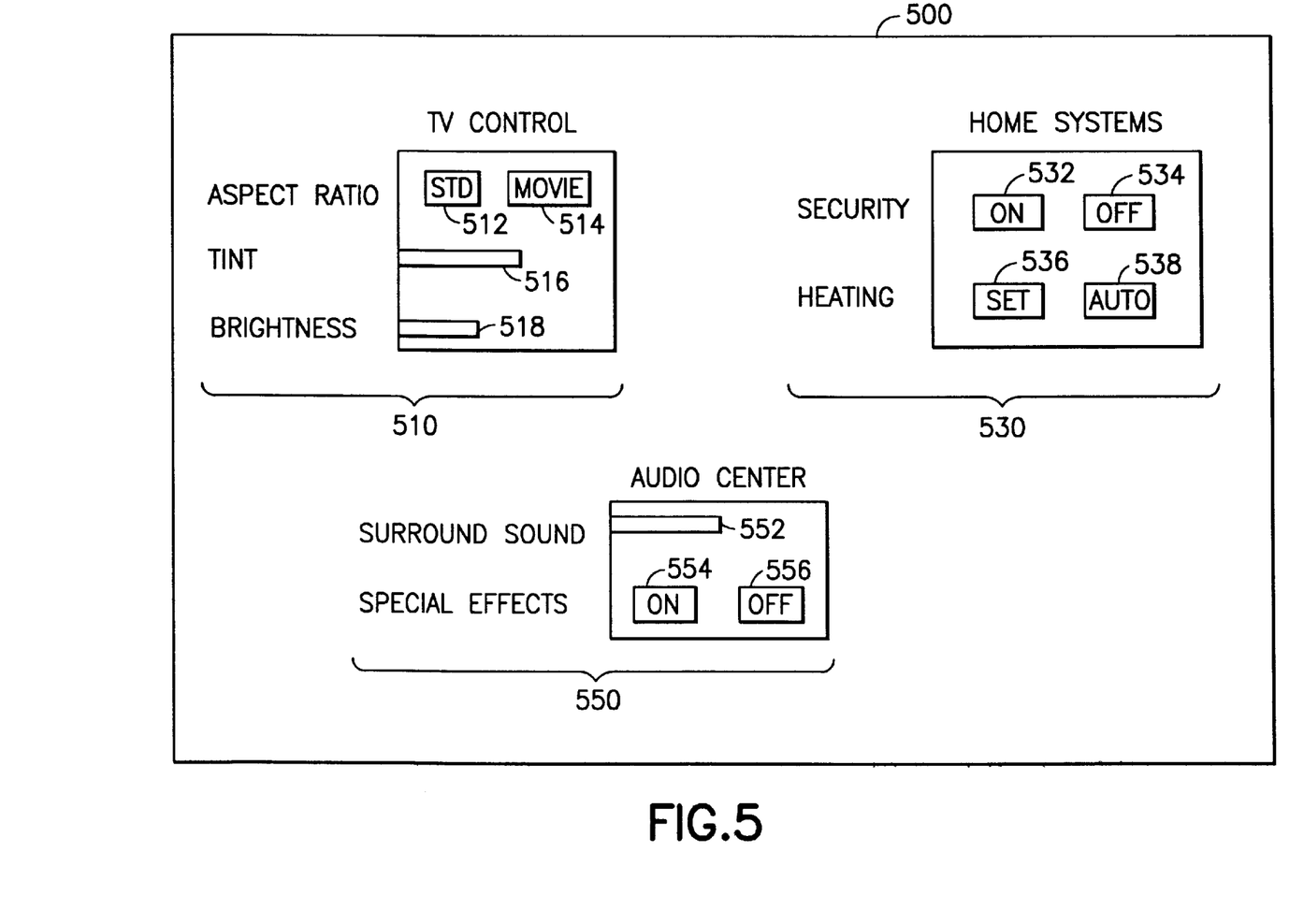
FIG. 5 is an illustration of a screen with HTML/HTVP display data for selecting television and non-television appliance function calls in accordance with the present invention.

For example, FIG. 5 is an illustration of a screen with HTML/HTVP display data for selecting function calls in accordance with the present invention. Both television and non-television function calls are provided. The screen, shown generally at 500, includes a "TV Control" field 510, a "Home Systems" field 530, and an "Audio Center" field 550. The TV Control field 510 allows a user to control various television related functions. In the illustration shown, the aspect ratio may be controlled by a user-selectable button 512 for a standard (std) aspect ratio, and a button 514 for a "movie" aspect ratio. The tint level of the video image is represented by a bar 516, and the brightness is represented by a bar 518.

For example, when the aspect ratio is changed, a user command is provided to the user command processor 230 which then instructs the memory manager 225 and video decompression processor 240 to provide the video signal with the appropriate aspect ratio. This is an example of a television-related function call since a television function is being controlled via the use of a HTML/HTVP display screen.

In the Home Systems field 530, a security system such as a user's home security system includes an "on" button 532 and an "off" button 534. A heating system may be controlled using a "set" button 536 or an "auto" button 538. The set button 536 allows the user to select customized settings, while the auto button 538 may provide a default profile. In either case, the user provides a command to the user command processor 230 which then provides an appropriate signal to the security or heating system. Referring to FIG. 2, the decoder 180 can be provided with interface means (not shown) for providing an appropriate control signal to the non-television system which is to be controlled via the screen 500. This is an example of a non-television related function call since a non-television function and/or appliance is being controlled via the use of a HTML/HTVP display screen.

A non-television function or appliance is defined herein to refer to any device, apparatus or system other than a television, and includes, for example, a heating or air conditioning system, a security system, an air filtering system, or household appliances such as a water heater, clothes washing machine, or dishwasher. Additionally, the term encompasses electronic equipment such as audio amplifiers, filters, and recording devices such as those which use digital audio tapes, magnetic and optical cassette tapes, and recordable compact discs, to reproduce, record or otherwise process the audio portion of a programming service signal. The term further encompasses analogous electronic equipment for recording or otherwise processing the video portion of a programming service signal outside of the television, including those which use digital video discs and laser discs. Additionally, a decoder such as the decoder 180 of FIG. 2 may be consider to be a non-television appliance.

In the Audio Center field 550, a surround sound level is represented by a bar 552, and a special effects switch can be controlled by an "on" button 554 and an "off" button 556. In this case, the user provides a command to the user command processor 230 which then provides an appropriate signal to the audio equipment. This is another example of a non-television related function call.

In the examples of FIG. 5, various other display options are possible according to the information to be conveyed and the desired screen appearance. Moreover, the selection of a particular button or other interface device, such as the set button 536 in the Home Systems field 530 may select a hyperlink to another display data screen with additional function call options. For example, after selecting the set button 536, a screen may be displayed which allows the user to set the desired temperature at different times of the day, different days of the week, and/or at different regions of the home or business which is being heated.

Moreover, the decoder 180 may be provided with timing means (not shown) for maintaining the selected schedule. Thus, a heating system which is not programmable or otherwise automated can be controlled in an automated manner via a television screen using HTML/HTVP data. Other appliances, for example, such as a dishwasher, hot water heater, or coffee maker, may also be controlled in this manner. In any case, the HTML/HTVP data provides the user with a display which presents the available programming options, and responds to the user commands by implementing function calls that send the appropriate command signal to the television or non-television related appliance.

In view of the above, it should be appreciated that the present invention provides an apparatus and method for providing textual and graphical displays using hypertext markup language (HTML) for use with a television decoder. Additionally, HTML is adapted for use in controlling various television and non-television related functions with a syntax referred to as HTVP. Accordingly, the invention provides entertainment, educational, and informational displays for television viewers. Moreover, the invention allows a viewer to execute hyperlinks and function calls for viewing additional HTML/HTVP pages and/or programming service video, or for activating various television, non-television, or decoder functions. Moreover, the invention is compatible with virtually any type of programming service, including television, information services such as stock prices and weather data, and audio/video programming implemented in software including games and other programming.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for adapting hypertext markup language resources for use in a television broadcast network wherein the same programming service signals are broadcast to a plurality of subscriber decoders of the network, comprising the steps of:

broadcasting a common data signal comprising display data to the subscriber decoders, said display data being coded according to the hypertext markup language;

recovering said data signal at at least one of the subscriber decoders; and processing said data signal at the at least one subscriber decoder to provide a display signal according to said display data that is suitable for reproduction on a television that is associated with the at least one subscriber decoder;

wherein said display signal provides a display on the television with at least one of graphical and textual information that allows a user to invoke a function call for controlling a conventional television function of the television.

2. The method of claim 1, wherein:
   said display data allows a user to invoke hyperlinks for viewing selected portions of said display data.

3. The method of claim 1, wherein:
   said display data allows a user to invoke function calls for viewing selected portions of an associated video programming service signal.

4. The method of claim 1, wherein:
   said display data provides information regarding an associated video programming service signal.

5. The method of claim 1, wherein:
   said display data provides a viewer input field for allowing viewing of an associated video programming service signal on a pay-per-view fee basis.

6. The method of claim 1, comprising the further step of:
   processing said data signal and an associated video programming service signal for display on the television in an overlay manner.

7. The method of claim 1, wherein:
   said data signal and an associated video programming service signal are carried together in a digital transport data stream that is broadcast to said subscriber decoders.

8. An apparatus for adapting hypertext markup language resources for use in a television broadcast network wherein the same programming service signals are broadcast to a plurality of subscriber decoders of the network, comprising:

means for broadcasting a common data signal comprising display data to the subscriber decoders, said display data being coded according to the hypertext markup language;

means for recovering said data signal at at least one of the subscriber decoders;

a processor associated with said at least one subscriber decoder for processing said data signal to provide a display signal according to said display data that is suitable for reproduction on a television that is associated with the at least one subscriber decoder; and means responsive to said display signal for providing a display on the television with at least one of graphical and textual information that allows a user to invoke a function call for controlling a conventional television function of the television.

9. The apparatus of claim 8, wherein:
   said display data allows a user to invoke hyperlinks for viewing selected portions of said display data.

10. The apparatus of claim 8, wherein:
said display data allows a user to invoke function calls for viewing selected portions of an associated video programming service signal.

11. The apparatus of claim 8, wherein:
said display data provides information regarding an associated video programming service signal.

12. The apparatus of claim 8, wherein:
said display data provides a viewer input field for allowing viewing of an associated video programming service signal on a pay-per-view fee basis.

13. The apparatus of claim 8, further comprising:
a combiner for combining said data signal and an associated video programming service signal for display on the television in an overlay manner.

14. The apparatus of claim 8, wherein:
said data signal and an associated video programming service signal are carried together in a digital transport data stream that is broadcast to said subscriber terminals.

15. A receiver for adapting hypertext markup language resources for use in a television broadcast network wherein the same programming service signals are broadcast to a plurality of subscriber decoders of the network, said receiver being associated with at least one of said subscriber decoders, comprising:
an input for receiving a common data signal comprising display data that is broadcast to the subscriber decoders, said display data being coded according to the hypertext markup language;
a display data processor for processing said data signal to provide a display signal according to said display data that is suitable for reproduction on a television that is associated with the at least one subscriber decoder; and
a user command processor operatively associated with said display data processor; wherein:
the television is adapted to provide a display with at least one of graphical and textual information in response to said display signal; and
said user command processor receives user commands in accordance with said display and invokes a corresponding function call for controlling a conventional television function of the television.

16. The receiver of claim 15, further comprising:
an input for receiving a video programming service signal; and
a video processor for processing said video programming service signal; wherein:
said display data signal provides information regarding said video programming service signal.

17. The receiver of claim 16, wherein:
said video processor is responsive to said user command processor for invoking said function calls.

18. The receiver of claim 15, wherein:
said display data processor is responsive to said user command processor for allowing a user to invoke hyperlinks for viewing selected portions of said display data.

19. The receiver of claim 15, wherein said display data provides a viewer input field in said display for allowing viewing of an associated video programming service signal on a pay-per-view fee basis.

20. The receiver of claim 15, wherein:
a relationship between said function calls and said conventional television function is determined according to a uniform resource syntax.

21. The receiver of claim 15, wherein:
said data signal and an associated video programming service signal are carried together in a digital transport data stream that is broadcast to said receiver.

22. The method of claim 1, wherein:
said data signal comprises information coded according to an HTVP uniform resource locator (URL) syntax for defining said function calls.

23. The apparatus of claim 18, wherein:
said data signal comprises information coded according to an HTVP uniform resource locator (URL) syntax for defining said function calls.

24. The receiver of claim 15, wherein:
said data signal comprises information coded according to an HTVP uniform resource locator (URL) syntax for defining said function calls.

25. The method of claim 1, wherein:
said conventional television function includes changing a channel of the television.

26. The method of claim 1, wherein said conventional television function includes at least one of:
returning a text string representing a channel number;
returning a text string representing a channel name;
enabling or disabling audio muting;
adjusting a volume;
returning a program name;
recording a purchase of a specified item with an item identifier;
setting a language preference; and
transmitting a quoted string using an infrared blaster.

27. The apparatus of claim 8, wherein:
said conventional television function includes changing a channel of the television.

28. The apparatus of claim 8, wherein said conventional television function includes at least one of:
returning a text string representing a channel number;
returning a text string representing a channel name;
enabling or disabling audio muting;
adjusting a volume;
returning a program name;
recording a purchase of a specified item with an item identifier;
setting a language preference; and
transmitting a quoted string using an infrared blaster.

29. The receiver of claim 15, wherein:
said conventional television function includes changing a channel of the television.

30. The receiver of claim 15, wherein said conventional television function includes at least one of:
returning a text string representing a channel number;
returning a text string representing a channel name;
enabling or disabling audio muting;
adjusting a volume;
returning a program name;
recording a purchase of a specified item with an item identifier;
setting a language preference; and
transmitting a quoted string using an infrared blaster.

* * * * *